United States Patent
Barker et al.

(10) Patent No.: US 9,458,830 B2
(45) Date of Patent: Oct. 4, 2016

(54) SYSTEM AND METHOD FOR IMPROVING REACTIVE CURRENT RESPONSE TIME IN A WIND TURBINE

(71) Applicant: General Electric Company, Schenectady, NY (US)

(72) Inventors: Sidney Allen Barker, Troutville, VA (US); Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 14/477,903

(22) Filed: Sep. 5, 2014

(65) Prior Publication Data
US 2016/0069325 A1    Mar. 10, 2016

(51) Int. Cl.
*F03D 9/00*    (2016.01)
*H02P 9/10*    (2006.01)
(Continued)

(52) U.S. Cl.
CPC .............. *F03D 9/003* (2013.01); *H02J 3/18* (2013.01); *H02P 9/102* (2013.01); *H02P 9/305* (2013.01); *H02P 9/007* (2013.01); *Y02E 10/72* (2013.01)

(58) Field of Classification Search
CPC .............. H02P 21/0035; H02P 6/002; H02P 23/0081; G05F 1/70; H02J 3/1842; Y02E 10/763; Y02E 40/22; Y02E 10/723; F03D 9/003; F03D 7/0284; G01R 13/00; H02M 7/525; H01M 8/04574; H01M 8/04865; H01M 8/04895
USPC ......... 290/44, 55; 700/286, 287; 322/44, 20, 322/24, 28; 315/291, 308; 323/205; 318/812, 802; 324/500; 310/111; 204/298.08
See application file for complete search history.

(56) References Cited

U.S. PATENT DOCUMENTS

RE31,840 E  *  2/1985  Harris .................... H01F 19/04
                                                        323/250
5,355,025 A  *  10/1994  Moran ...................... G05F 1/70
                                                        307/105
(Continued)

FOREIGN PATENT DOCUMENTS

CN        103326368 A      9/2013
WO       2010002402 A1     1/2010
WO     WO 2011120523 A2  * 10/2011  ............. F03D 9/003

OTHER PUBLICATIONS

E.On Netz, "Grid Code High and extra high voltage", E.On Netz GmbH Bayreuth, Apr. 1, 2006, pp. 12-16.*

(Continued)

*Primary Examiner* — Tulsidas C Patel
*Assistant Examiner* — Charles Reid, Jr.
(74) *Attorney, Agent, or Firm* — Dority & Manning, P.A.

(57) ABSTRACT

The present disclosure is directed to a system and method for improving reactive current response time in a renewable energy power system connected to a power grid. The method includes providing, via a controller of the power system, a permissive logic relating to the power grid. Another step includes determining, via a controller of the renewable energy power system, a reactive current reference command for the renewable energy power system in response to the permissive logic being satisfied. The method also includes generating, via the controller, a reactive current pulse command for the renewable energy power system. Thus, the controller is configured to determine a total reactive current command by combining the reactive current reference command and the reactive current pulse command. Further, the method includes operating the renewable energy power system based on the total reactive current command so as to improve the current response time.

20 Claims, 6 Drawing Sheets

(51) Int. Cl.
*H02P 9/30* (2006.01)
*H02J 3/18* (2006.01)
*H02P 9/00* (2006.01)

(56) References Cited

U.S. PATENT DOCUMENTS

| | | | | |
|---|---|---|---|---|
| 5,952,816 | A * | 9/1999 | Larsen | H01F 38/18 323/209 |
| 6,242,895 | B1 * | 6/2001 | Fujii | G05F 1/70 323/207 |
| 6,573,690 | B2 * | 6/2003 | Ogusa | H02J 3/1842 323/207 |
| 7,821,157 | B2 | 10/2010 | Llorente Gonzelez et al. | |
| 8,120,932 | B2 * | 2/2012 | Folts | H02J 9/062 363/37 |
| 8,295,988 | B2 | 10/2012 | Yasugi | |
| 2012/0032443 | A1 | 2/2012 | Hehenberger | |
| 2013/0119663 | A1 * | 5/2013 | Birk | F03D 7/02 290/44 |
| 2013/0138257 | A1 * | 5/2013 | Edenfeld | F03D 7/04 700/287 |
| 2013/0193933 | A1 * | 8/2013 | Andresen | H02P 9/02 322/23 |
| 2014/0133198 | A1 * | 5/2014 | Koyama | H02J 3/1857 363/40 |
| 2014/0159367 | A1 * | 6/2014 | Yin | F03D 7/028 290/44 |
| 2014/0225370 | A1 * | 8/2014 | Mayer | H02J 3/16 290/44 |
| 2014/0339830 | A1 * | 11/2014 | Gupta | F03D 7/00 290/44 |
| 2015/0137520 | A1 * | 5/2015 | Garcia | H02J 3/1885 290/44 |

OTHER PUBLICATIONS

Danish Office Action issued in connection with corresponding DK Application No. PA201570555 on Feb. 15, 2016.

* cited by examiner

SYSTEM AND METHOD FOR IMPROVING REACTIVE CURRENT RESPONSE TIME IN A WIND TURBINE

FIELD OF THE INVENTION

The present disclosure relates generally to wind turbines, and more particular to a system and method for improving reactive current response time in a wind turbine during a low-voltage event on a power grid.

BACKGROUND OF THE INVENTION

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

In order to supply power to the power grid, wind turbines need to conform to certain requirements. For example, wind turbines may need to offer fault-ride through (e.g. low-voltage ride through) capability, which requires a wind turbine to stay connected to the power grid during one or more grid faults. As used herein, the terms "grid fault," "fault," or similar are intended to cover a change in the magnitude of grid voltage for a certain time duration. For example, when a grid fault occurs, voltage in the system can decrease by a significant amount for a short duration (e.g. typically less than 500 milliseconds). In addition, grid faults may occur for a variety of reasons, including but not limited to a phase conductor being connected to ground (i.e. a ground fault), short circuiting between two or more phase conductors, lightning and/or wind storms, and/or a transmission line being connected to the ground by accident.

In the past, during these inadvertent faults, it has been acceptable for a wind turbine to be immediately disconnected whenever the voltage reduction occurs. However, as wind turbines continue to increase in size and penetration of wind turbines on the grid increases, it is desirable for the wind turbines to remain on line and ride through such disturbances. In addition, it is also important for the wind turbines to generate energy after the fault is cleared. While the fault is still present and before recovery, it is beneficial for the wind turbine to supply reactive current to the power grid. Since grid faults are of a short duration, it is reasonable that the response of the reactive current be such that it reaches a specific magnitude within specific time. Thus, grid codes for some countries require a minimum reactive current response time during the onset of a low voltage ride-through (LVRT) event.

In many cases, it may not be optimal for the response time of the fastest current regulators of the power converter to be fast enough to meet the grid code requirements. Thus, it may be advantageous for the controller responsible for reactive current regulation to obtain the required response time by requesting a reactive current magnitude that is of greater magnitude than the code requires for an amount of time that is sufficient to speed up the response time required to reach the required amount of current. Such a reactive current reference command can result in the required current being obtained faster than it would have been without the additional command.

More specifically, the present disclosure provides a transient pulse that can be combined in with the reference reactive current required for the LVRT event in order to achieve a transiently higher total reactive current command. The transiently higher current command improves the current response time of the wind turbine and also prevents an excessive current command that may surpass system capabilities.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a method for improving reactive current response time of a renewable energy power system connected to a power grid. The method includes providing, via a controller of the renewable energy power system, a permissive logic relating to the power grid. In response to the permissive logic being satisfied, the method also includes determining, via the controller, a reactive current reference command and generating a reactive current pulse command for the renewable energy power system. The controller can then determine a total reactive current command by combining the reactive current reference command and the reactive current pulse command. Further, the method includes operating the renewable energy power system based on the total reactive current command so as to improve the current response time of the renewable energy power system.

In one embodiment, the permissive logic may include any one of or a combination of the following: an occurrence of an adverse grid voltage event, timing to delay the reactive current pulse command, timing that limits the reactive current pulse command at a certain repetition rate, an amount of negative sequence voltage of a grid fault, or similar. In addition, the adverse grid voltage event may include any substantial change in the grid voltage of the power grid, including but not limited to a low-voltage ride through (LVRT) event (e.g. a grid fault), a high-voltage ride through (HVRT) event, or similar.

In another embodiment, the step of generating the reactive current pulse command for the renewable energy power system may further include determining a difference between a grid voltage and a voltage activation threshold. Thus another step of the method may include determining a magnitude and a duration for the reactive current pulse command based on the difference, wherein the magnitude and duration of the reactive current pulse command are sufficient to increase the reactive current response time of the renewable energy power system. In a particular embodiment, for example, if the grid voltage drops below the voltage activation threshold such that the difference is positive, the permissive logic may be deemed satisfied. In certain embodiments, the voltage activation threshold may be less than or equal to from 90% of a nominal grid voltage. In still further embodiments, the voltage activation threshold may be any percentage of the nominal grid voltage.

In a further embodiment, the method may also include a step of determining an upper limit for the reactive current pulse command for the renewable energy power system so as to maintain the current within system capabilities. In still another embodiment, the step of determining the total reactive current command by combining the reactive current reference command and the reactive current pulse command further may include adding or summing the reactive current reference command and the reactive current pulse command.

In yet a further embodiment, the renewable energy power system as described herein may include any suitable power system, including but not limited to a wind turbine power system (e.g. a wind turbine) or a solar power system.

In another aspect, the present disclosure is directed to a method for improving reactive current response time of a renewable energy power system connected to a power grid after an adverse voltage condition occurs in the grid. The method includes generating, via a controller of the renewable energy power system, a reactive current pulse command for the renewable energy system. Another step includes determining a total reactive current command based at least partially on the reactive current pulse command. The method also includes operating the renewable energy power system based on the total reactive current command so as to improve the current response time of the renewable energy power system. It should also be understood that the method may further include any of the additional steps and/or features as described herein.

In yet another aspect, the present disclosure is directed to a system for improving reactive current response time of a renewable energy power system connected to a power grid. The system includes a controller configured to perform one or more operations. For example, in one embodiment, the one or more operations include, at least, providing a permissive logic relating to the power grid, determining a reactive current reference command for the renewable energy power system in response to the permissive logic being satisfied, generating a reactive current pulse command for the renewable energy power system, determining a total reactive current command by combining the reactive current reference command and the reactive current pulse command, and operating the renewable energy power system based on the total reactive current command so as to improve the current response time of the power grid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for improving reactive current response time in a renewable energy power system connected to a power grid after an adverse voltage event (e.g. a DIRT event or an HVRT event) has occurred in the grid. More specifically, in response to the adverse voltage event, a controller of the renewable energy power system generates a reactive current pulse command and combines the pulse command with a reactive current reference command required for the event in order to achieve a transiently higher total reactive current command. The controller then operates the renewable energy power system based on the transiently higher total reactive current command so as to achieve the desired response time and prevent excessive currents within the power system that may surpass system capabilities.

Figure 1:
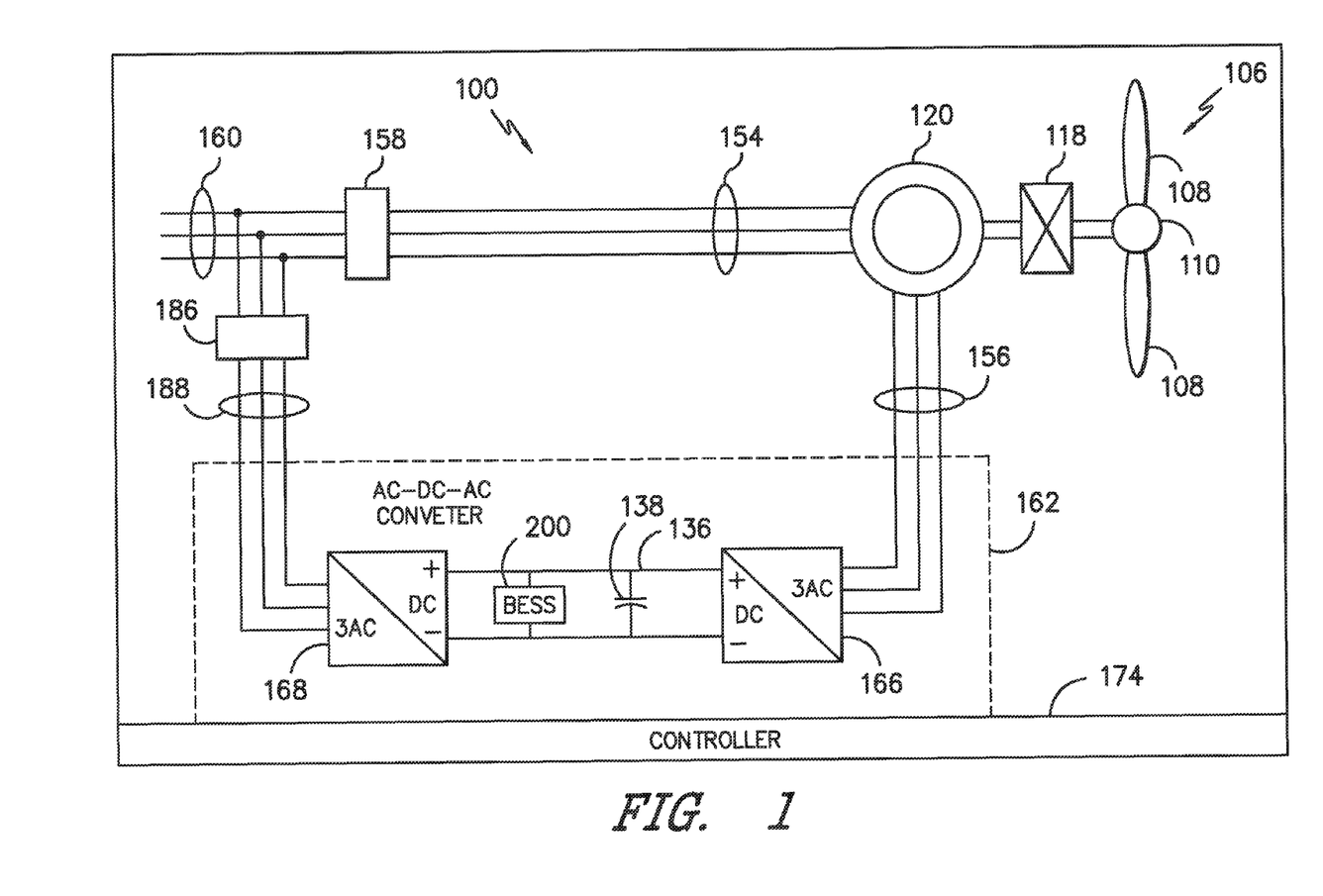
FIG. 1 illustrates one embodiment of an example renewable energy power system according to the present disclosure.

Referring now to the drawings, FIG. 1 illustrates an example wind driven doubly-fed induction generator (DFIG) system 100 according to one embodiment of the present disclosure. Example aspects of the present disclosure are discussed with reference to the DFIG wind turbine 100 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotatable hub 110, and together define a propeller. The propeller is coupled to an optional gearbox 118, which is, in turn, coupled to a generator 120. In accordance with aspects of the present disclosure, the generator 120 may be any suitable generator, including, but not limited to a doubly fed induction generator (DFIG) or a fully fed induction generator. The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

Referring to the power converter 162, the DFIG 120 is coupled via the rotor bus 156 to a rotor-side converter 166. The rotor-side converter 166 is coupled to a line-side converter 168 which in turn is coupled to a line-side bus 188. In example configurations, the rotor-side converter 166 and the line-side converter 168 are configured for normal operating mode in a three-phase, pulse width modulation (PWM) arrangement using insulated gate bipolar transistor (IGBT) switching elements. The rotor-side converter 166 and the line-side converter 168 can be coupled via a DC link 136 across which is the DC link capacitor 138.

Figure 2:
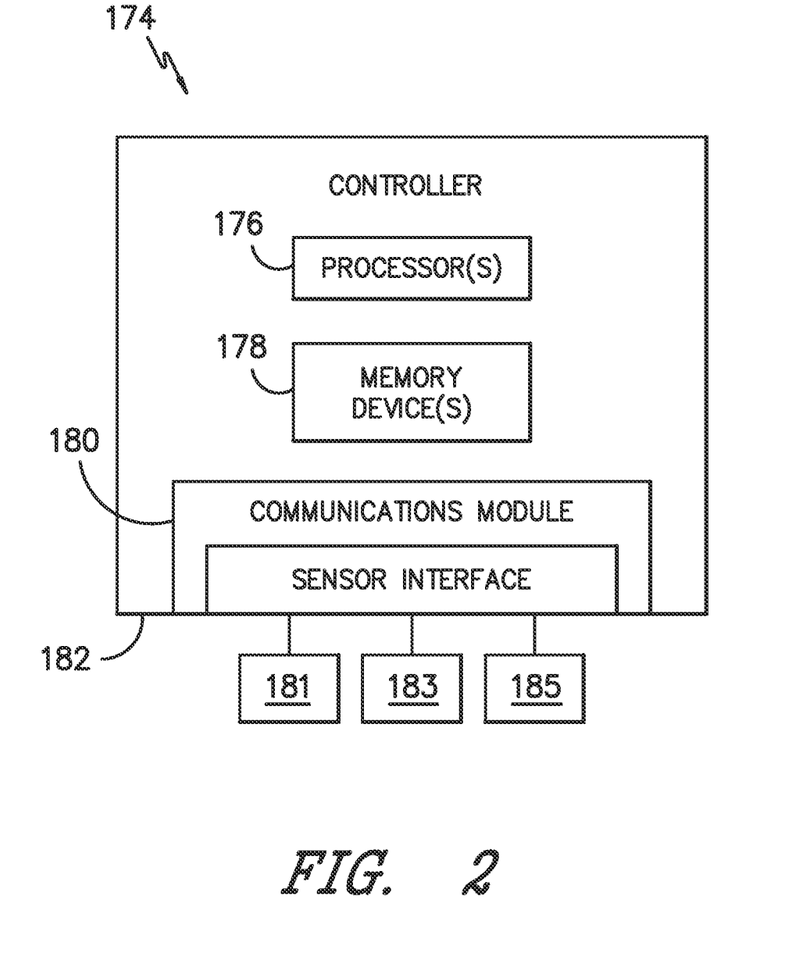
FIG. 2 illustrates a block diagram of one embodiment of a controller suitable for use with the renewable energy power system shown in FIG. 1 according to the present disclosure.

The power system 100 may also include a controller 174 configured to control the operation of the various components of the system 100 as well as implementing any method steps as described herein. Thus, the controller 174 can include any number of control devices. In one implementation, as shown in FIG. 2, the controller 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands to the various system components. Additionally, the controller 174 may include a communications module 180 to facilitate communications between the controller 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controller 174 to perform the various functions as described herein.

During operation, alternating current (AC) power generated at the DFIG 120 by rotation of the rotor 106 is provided via a dual path to an electrical grid 160. The dual paths are defined by the stator bus 154 and the rotor bus 156. On the rotor bus side 156, sinusoidal multi-phase (e.g. three-phase) AC power is provided to the power converter 162. The rotor-side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 160. In particular, switching elements (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFIG 120 to provide multi-phase power (e.g. three-phase power) having a frequency maintained substantially at the frequency of the electrical grid 160 (e.g. 50 Hz/60 Hz).

Various circuit breakers and switches, such as a converter breaker 186, can be included in the power system 100 to connect or disconnect corresponding buses, for example, when current flow is excessive and can damage components of the system 100 or for other operational considerations. Additional protection components can also be included in the power system 100.

Still referring to FIG. 1, the power system 100 may also include a battery energy storage system (BESS) 200 coupled to the power converter 162. More specifically, as shown in the illustrated embodiment, the BESS 200 can be connected in parallel with the DC link 136 of the power converter 162. The battery energy storage system 200 can be used to provide power to the DC link 136 under certain conditions. For instance, the BESS 200 can be used to provide power to the DC link 136 to increase output of the power system 100 when wind speed drops. Power can also be supplied and stored in the BESS 200 during operation of the power system 100.

Figure 3:
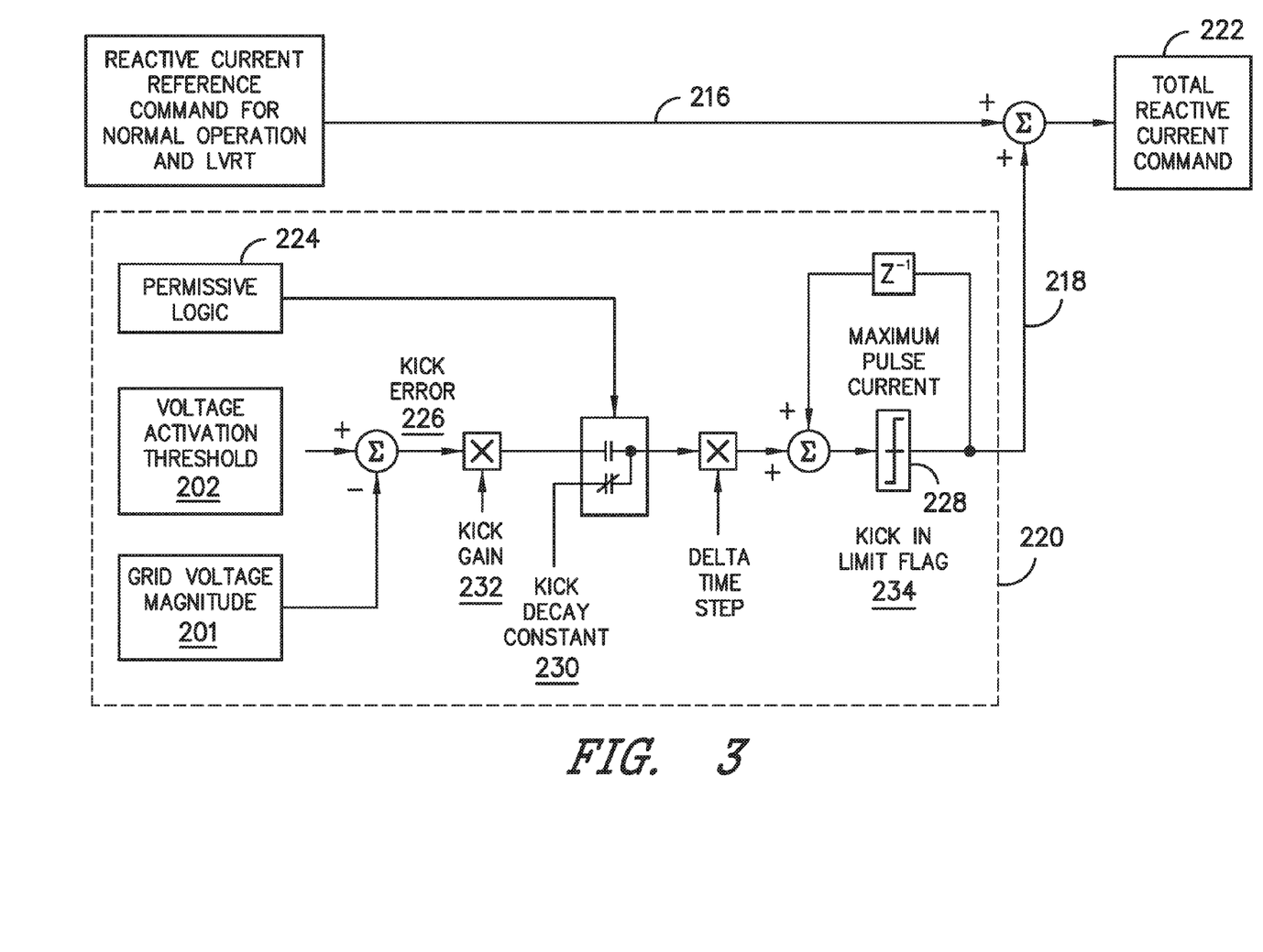
FIG. 3 illustrates a schematic diagram of one embodiment of a control scheme that may be implemented by the controller of FIG. 2, particularly illustrating a reactive current pulse command combined with the reactive current reference command according to the present disclosure.

Referring now to FIG. 3, a schematic diagram of a control scheme that may be implemented by the controller 174 for improving reactive current response time of the power system 100 connected to the power grid 160 according to one embodiment of the present disclosure is illustrated. As shown, the total reactive current command 222 is obtained by combining or summing the main reactive current reference command 216 and the reactive current pulse command 218. The main reactive current reference command 216 may be determined by conventional means known in the art and may be used during normal operation or during an adverse voltage event. Further, the reactive current pulse command 218 may be determined using a variety of methods. For example, as shown, the control scheme 220 (as indicated by the dotted box) illustrates one embodiment for generating the reactive current pulse command 218 for the power system 100. In most circumstances, the reactive current pulse command 218 is zero due to the grid voltage operating within prescribed tolerances (i.e. no adverse voltage condition is occurring). Thus, in certain embodiments, the controller 174 is configured to activate the control scheme 220 so as to generate the reactive current pulse command 218 only when a certain permissive logic 224 is satisfied. For example, in several embodiments, the permissive logic 224 may include certain qualifiers, such as characteristics of certain type of grid events, timing to delay the pulse, timing that only lets the pulse activate at a certain repetition rate, and/or similar. The permissive logic 224 may also be activated based on the amount or percent of negative sequence voltage of the grid fault(s). As such, as shown in the illustrated embodiment of FIG. 4, the permissive logic is activated when the voltage magnitude 201 drops below a voltage activation threshold 202.

Once the permissive logic 224 is satisfied, the control scheme 220 is configured to generate a pulse command 218 using any suitable means known in the art. For example, in one embodiment, the control scheme 220 includes determining a difference 226 or "kick error" between the voltage activation threshold 202 and the grid voltage magnitude 201. In various embodiments, the voltage activation threshold 202 may be a percentage of the nominal grid voltage. For example, in certain embodiments, the voltage activation threshold 202 may be from about 20% to about 90% of the nominal grid voltage, more preferably from about 30% to about 80%, and more preferably from about 40% to about 60%. Thus, when the grid voltage 201 drops below the voltage activation threshold 202, the kick error 226 will become positive. Accordingly, the permissive logic 224 is configured to monitor for a positive kick error 226 and use the positive kick error 226 with other combinational logic to activate the reactive current pulse command 218 output and allow the integrator 228 to begin driving the current of the power system 100 in a positive direction until it reaches a maximum pulse current value. The maximum pulse current value can then be set as the reactive current pulse command 218.

In additional embodiments, the rate at which the pulse command 218 reaches its maximum value by the integrator 228 is a function of the kick gain 232 and the amount of kick error 226. Thus, the rate can be increased or decreased accordingly. Further, the integrator 228 may be configured to provide upper and lower current limits so as to prevent an excessive current command to the power system 100 that surpasses system capability.

In further embodiments, once the grid voltage 201 is operating within prescribed limits, the resulting pulse 218 can be decayed to zero either by removal of the permissive logic 224 or allowing the grid voltage 201 to surpass the voltage activation threshold 202. For example, when the permissive logic 224 is no longer active, the kick decay constant 230 of the control scheme 220 can be used to decay the pulse through the output integrator 228 until the integrator 228 reaches zero. In additional embodiments, the control scheme 220 may also include an indicator (e.g. kick in limit flag 234) that can be set when the integrator 228 reaches zero.

Figure 4:
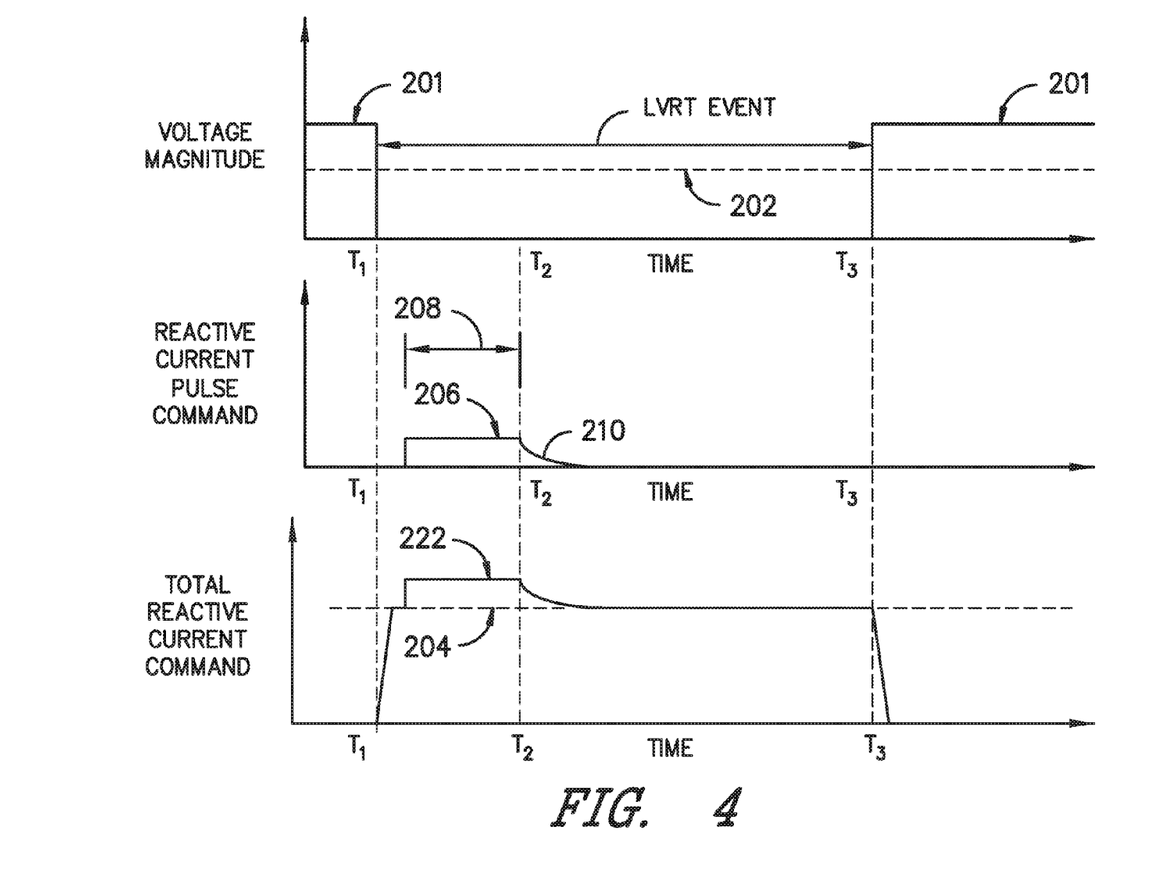
FIG. 4 illustrates a plurality of graphs, particularly illustrating the desired output of one embodiment of a method for improving reactive current response time in a power grid according to the present disclosure.

Referring now to FIG. 4, a plurality of graphs is illustrated, particularly illustrating an adverse voltage event and the desired output of the control scheme of FIG. 3. As shown, the upper graph illustrates the voltage magnitude 201 around the time of a grid voltage event (e.g. the LVRT event). More specifically, as shown at time $T_1$, the voltage magnitude 201 drops to some level that requires reactive current insertion. For example, as shown, the voltage magnitude 201 drops below the voltage activation threshold as indicated by line 202. At this time, where a certain permissive logic has been satisfied, the controller 174 is configured to demand or command the required final current level 204 of the power system 100 as shown in the lowest graph.

In order to reach the final current level 204, the controller 174 generates a pulse of current 206 in the power system 100, as shown in the middle graph, which typically has a constant magnitude for a specified time 208. After the specified time 208, the control scheme 220 can allow the pulse of current 206 to decay at a predetermined rate as shown at 210. In certain embodiments, the pulse of current 206 is intended to be of a fixed, but adjustable duration, depending on the voltage event. For example, in one embodiment, a timer can be used to determine the duration of the pulse of current 206 for the power system 100. In addition, the control scheme 220 may be configured to end the pulse of current 206 if the voltage event ends before a predetermined time expires so as to prevent the insertion of the pulse of current 206 when it is not needed or when it may be undesirable. The controller 174 can then determine the composite or total reactive current command 222 by summing the required final current level 204 (i.e. the reactive current reference command) and the pulse command 206 as shown in the lowest graph. In addition, as shown at time $T_2$, once the voltage magnitude 201 is restored (e.g. the permissive is no longer active or the voltage 201 surpasses the voltage activation threshold 202), the control scheme 220 allows the pulse of current 206 to decay to zero and the total reactive current command returns to the value determined by the required final current level 204.

Further, if the grid event ends during the pulse current, the reactive current command pulse will return to zero.

Figure 5:
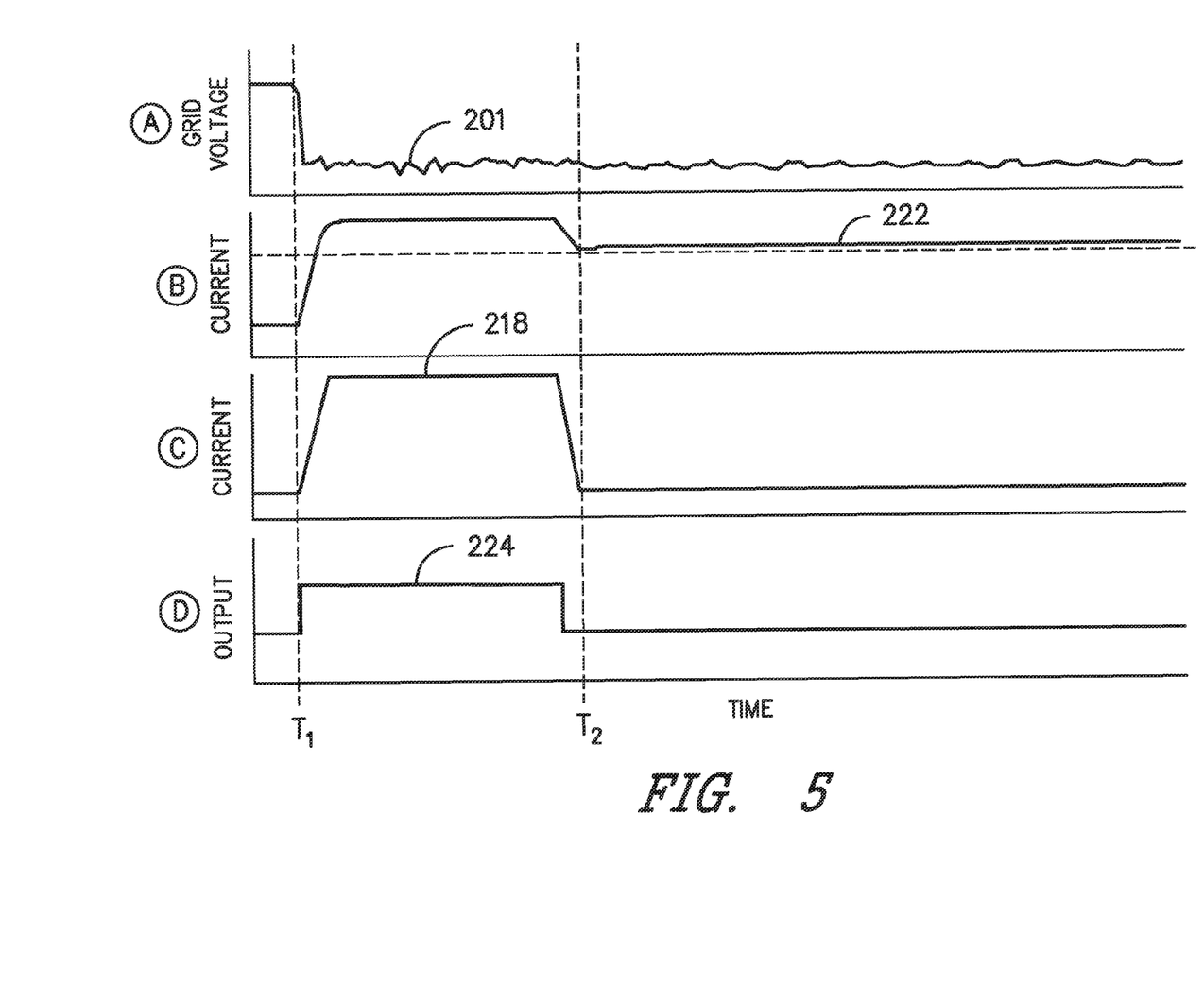
FIG. 5 illustrates a plurality of graphs, particularly illustrating an adverse voltage event, a total reactive current command, a reactive current pulse, and a desired output, respectively, according to one embodiment of the present disclosure; and, FIG. 6 illustrates one embodiment of a flow diagram of an example method for improving reactive current response time of a power grid according to the present disclosure.

Referring now to FIG. 5, another plurality of graphs is illustrated, particularly illustrating the grid voltage magnitude 201 during an adverse voltage event (graph A) that does not end during the time shown, a total reactive current command 222 (graph B), a reactive current pulse command (graph C), and a permissive logic output 234 (graph D) according to the control scheme 220 of FIG. 3. More specifically, graph (A) illustrates a voltage drop at time $T_1$ that represents a low- or zero-voltage event (e.g. a grid fault) occurring at the power grid 160. Graph (B) illustrates the total reactive current command 222 of the power system 100 which delivers required reactive current to the power grid 160 in order to help meet the required response time and prevents an excessive current command that surpasses system capability by dropping back to continuous rated current after time $T_2$. Graph (C) illustrates the reactive current pulse 218 that is utilized by the controller 174 to obtain the total reactive current command 222. Graph (D) illustrates one embodiment of permissive logic output 224 (e.g. Boolean data) indicating that the permissive logic is satisfied between $T_1$ and $T_2$. More specifically, as shown between $T_1$ and $T_2$, since the permissive logic is satisfied (i.e. the voltage is below the voltage activation threshold and the duration is within requirements for reactive current injection), the pulse formation control scheme 220 of FIG. 3 may be activated so as to generate a pulse of current through the power system 100 that improves current response time of the system 100.

Figure 6:
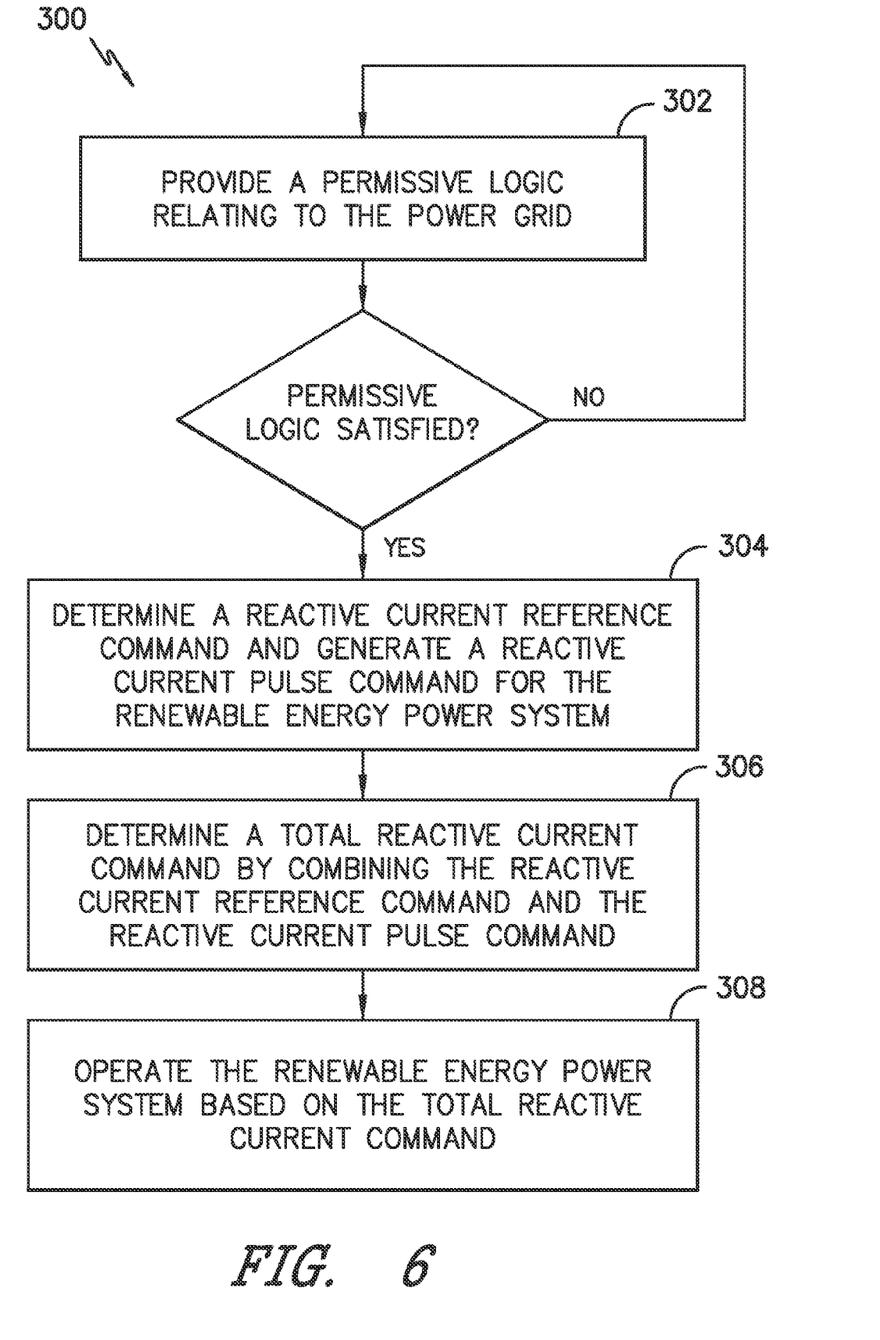

Referring now to FIG. 6, a flow diagram of an example method 300 for improving reactive current response time in a renewable energy power system connected to a power grid according to the present disclosure is illustrated. As shown, the method 300 includes a step 302 of providing a permissive logic relating to the power grid. In response to the permissive logic being satisfied, the method 300 includes determining a reactive current reference command for the renewable energy power system and generating a reactive current pulse command for the renewable energy power system (step 304). The method 300 may also include determining a total reactive current command by combining (e.g. adding) the reactive current reference command and the reactive current pulse command (step 306). In addition, as shown, the method 300 includes operating the renewable energy power system based on the total reactive current command so as to improve the current response time of the renewable energy power system (step 308).

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for improving reactive current response time of a renewable energy power system connected to a power grid, the method comprising:
   providing, via a controller of the renewable energy power system, a permissive logic relating to the power grid;
   in response to the permissive logic being satisfied, determining, via the controller, a reactive current reference command for the renewable energy power system and generating a reactive current pulse command for the renewable energy power system, wherein generating the reactive current pulse command for the renewable energy power system further comprises driving a current of the renewable energy power system in a positive direction until it reaches a maximum pulse current value and setting the reactive current pulse command as the maximum pulse current value;
   determining, via the controller, a total reactive current command as a function of the reactive current reference command and the reactive current pulse command; and,
   operating the renewable energy power system based on the total reactive current command so as to improve the current response time of the renewable energy power system.

2. The method of claim 1, wherein the permissive logic comprises at least one of an occurrence of an adverse grid voltage event, timing to delay the reactive current pulse command, timing that limits the reactive current pulse command at a certain repetition rate, an amount of negative sequence voltage of a grid fault, or one or more grid characteristics.

3. The method of claim 2, wherein the adverse grid voltage event comprises at least one of a low-voltage ride through (LVRT) event, high-voltage ride through (HVRT) event, or a grid fault.

4. The method of claim 1, wherein generating the reactive current pulse command for the renewable energy power system further comprises:
   determining a difference between a grid voltage and a voltage activation threshold; and,
   determining a magnitude and duration for the reactive current pulse command based on the difference, wherein the magnitude and duration of the reactive current pulse command are sufficient to increase the reactive current response time of the renewable energy power system.

5. The method of claim 4, wherein if the grid voltage drops below the voltage activation threshold, the difference is positive and the permissive logic is satisfied.

6. The method of claim 4, wherein the voltage activation threshold comprises less than or equal to about 90% of a nominal grid voltage.

7. The method of claim 1, wherein driving the current of the renewable energy power system in the positive direction until it reaches the maximum pulse current value further comprises:
   providing an upper current limit and a lower current limit for an integrator; and
   driving the current via the integrator.

8. The method of claim 1, wherein determining the total reactive current command as a function of the reactive current reference command and the reactive current pulse command further comprises adding the reactive current pulse command to the reactive reference current command.

9. The method of claim 1, wherein the renewable energy power system comprises at least one of a wind turbine power system or a solar power system.

10. A method for improving reactive current response time of a renewable energy power system connected to a power grid after an adverse voltage condition occurs in the power grid, the method comprising:
    generating, via a controller of the renewable energy power system, a reactive current pulse command for the renewable energy power system, wherein generating the reactive current pulse command for the renewable energy power system further comprises driving a current of the renewable energy power system in a positive direction until it reaches a maximum pulse current value and setting the reactive current pulse command as the maximum pulse current value;
    determining, via the controller, a total reactive current command based at least partially on the reactive current pulse command; and,
    operating, via the controller, the renewable energy power system based on the total reactive current command so as to improve the current response time of the renewable energy power system.

11. The method of claim 10, further comprising providing a permissive logic relating to the power grid, and in response to the permissive logic being satisfied, generating the reactive current pulse command for the renewable energy power system.

12. The method of claim 11, wherein the permissive logic comprises at least one of an occurrence of an adverse grid voltage event, timing to delay the reactive current pulse command, timing that limits the reactive current pulse command at a certain repetition rate, an amount of negative sequence voltage of a grid fault, or one or more grid characteristics.

13. The method of claim 12, wherein the adverse grid voltage event comprises at least one of a low-voltage ride through (LVRT) event, high-voltage ride through (HVRT) event, or a grid fault.

14. The method of claim 10, wherein generating the reactive current pulse command for the renewable energy power system further comprises:
    determining a difference between a grid voltage and a voltage activation threshold; and,
    determining a magnitude and duration for the reactive current pulse command based on the difference, wherein the magnitude and duration of the reactive current pulse command are sufficient to increase the reactive current response time of the renewable energy power system.

15. The method of claim 14, wherein if the grid voltage drops below the voltage activation threshold, the difference is positive and the permissive logic is satisfied.

16. The method of claim 14, wherein the voltage activation threshold comprises less than or equal to from about 90% of a nominal grid voltage.

17. The method of claim 10, wherein driving the current of the renewable energy power system in the positive direction until it reaches the maximum pulse current value further comprises:
   providing an upper current limit and a lower current limit for an integrator; and
   driving the current via the integrator.

18. The method of claim 10, wherein determining the total reactive current command as a function of the reactive current reference command and the reactive current pulse command further comprises adding the reactive current pulse command to the reactive reference current command.

19. The method of claim 10, wherein the renewable energy power system comprises at least one of a wind turbine power system or a solar power system.

20. A system for improving reactive current response time of a renewable energy power system connected to a power grid, the system comprising:
   a controller configured to perform one or more operations, the one of more operations comprising:
      providing a permissive logic relating to the power grid;
      in response to the permissive logic being satisfied, determining a reactive current reference command for the renewable energy power system and generating a reactive current pulse command for the renewable energy power system, wherein generating the reactive current pulse command for the renewable energy power system further comprises driving a current of the renewable energy power system in a positive direction until it reaches a maximum pulse current value and setting the reactive current pulse command as the maximum pulse current value;
   determining a total reactive current command as a function of the reactive current reference command and the reactive current pulse command; and,
   operating the renewable energy power system based on the total reactive current command so as to improve the current response time of the renewable energy power system.

* * * * *